Dec. 14, 1948.   J. RABINOW   2,456,317
AUTOMATIC FOCUSING OF CAMERAS
Filed Feb. 13, 1946   2 Sheets-Sheet 1

Inventor
Jacob Rabinow

By Percy Hmoore
Attorney

Dec. 14, 1948.  J. RABINOW  2,456,317
AUTOMATIC FOCUSING OF CAMERAS
Filed Feb. 13, 1946  2 Sheets-Sheet 2
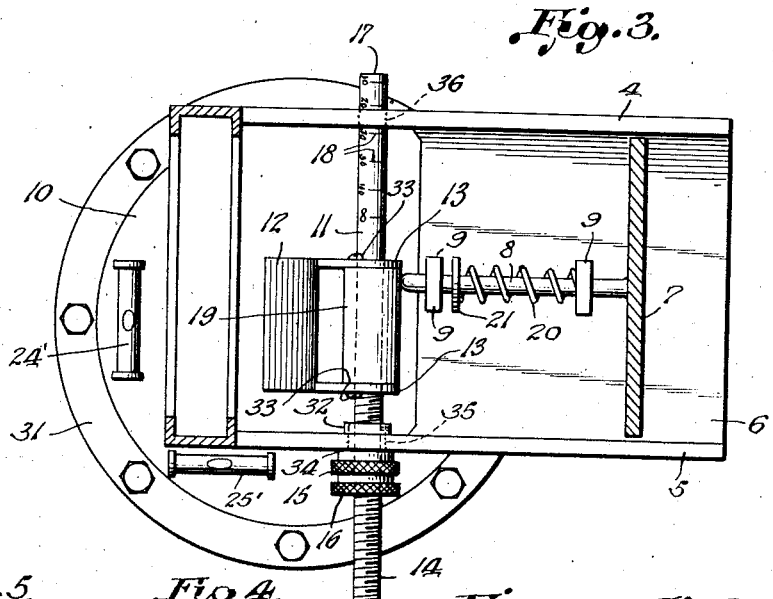
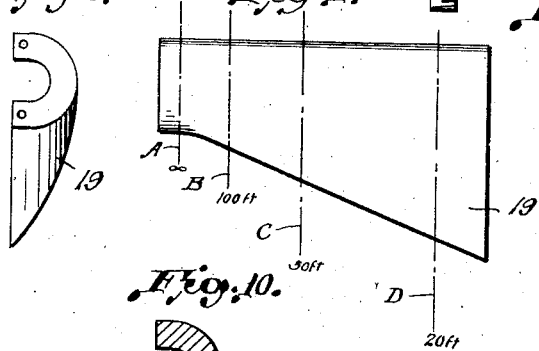
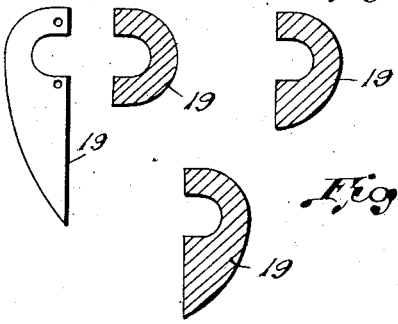
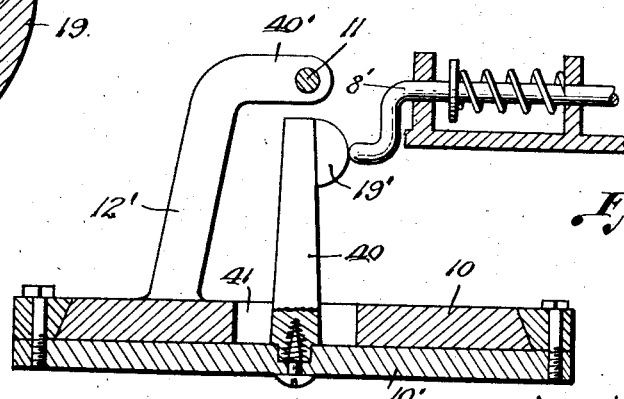
Inventor
Jacob Rabinow
By
Percy H. Moran
Attorney Patented Dec. 14, 1948

2,456,317

UNITED STATES PATENT OFFICE 2,456,317

AUTOMATIC FOCUSING OF CAMERAS

Jacob Rabinow, Washington, D. C.

Application February 13, 1946, Serial No. 647,327

4 Claims. (Cl. 95—45)

My invention relates to improvements in the automatic focusing of cameras and other optical devices used for photography, television and like purposes.

The invention relates more specifically to a mechanism which automatically focuses a camera or other optical device when the latter's major axis, or line of sight, is moved so as to change its angular relation to a fixed reference plane, such as the surface of an athletic field or the like.

Particular application envisaged for the invention is its use in equipment for recording or transmitting the action on a field of sport, such as basket ball, foot ball, horse racing and in the taking of "pan" shots of dancing, where a considerable surface area is involved and where the equipment is placed at some height from the ground or operational surface. While the arrangement and use shown are typical, it will be understood that many other uses and arrangements of the significant components may be devised without deviating from the main concepts of the present invention.

One of the principal objects of the invention is to provide a novel arrangement of camera and supporting mechanism therefor so constructed that once the camera has been properly focused it will be continually and automatically focused when pointed at any object on or any point within a predetermined surface or area.

Another object of the invention is to provide novel means for manually adjusting a camera in a lateral direction with respect to its base to bring the camera into focus, and means associated therewith for automatically moving the lens board toward or away from the sensitized surface such as that of a conventional film when the camera is tilted with respect to its base.

A further object of the invention is to provide mechanism including a cam and means for effecting lateral positioning of the camera with respect thereto whereby such positioning and the angular position of the camera with respect to the plane of action automatically results in the correct lens board position for sharp focus.

Other objects and advantages of my invention will be apparent from the following detailed description thereof and hereinafter pointed out.

In the accompanying drawing:

Figure 3 is a section taken on the line 3—3 of Figure 2;

Figure 4 is a side elevation of the cam;

Figures 5 and 6 are end views of the same;

Figure 7 is a section on the line A of Figure 4;

Figure 8 is a section on the line B of Figure 4;

Figure 9 is a section on the line C of Figure 4;

Figure 10 is a section on the line D of Figure 4; and

Figure 11 is a sectional view of a modification of the invention.

Figure 1:
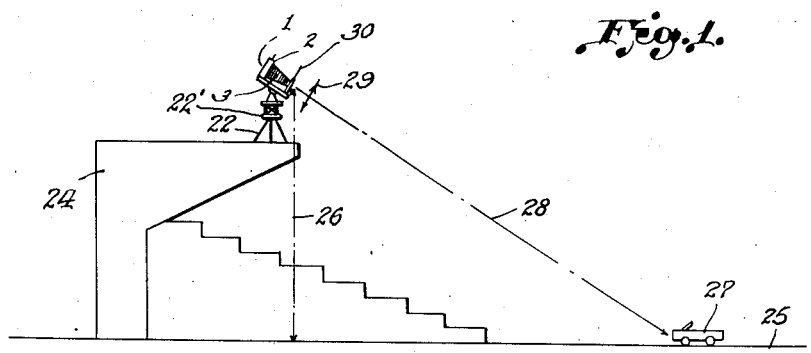
Figure 1 is a side elevation showing the invention mounted on a grandstand.

Referring more particularly to the drawing the numeral 1 denotes a camera having my improvements incorporated therein and illustrating one use of the present invention. As the camera shown is of conventional construction a detailed description thereof is deemed unnecessary. Suffice to say that it comprises a body section 2, supporting a bellows 3. Projecting forwardly from the body 2 are vertically disposed side members 4 and 5 between the forward ends of which a horizontally disposed support member or bottom 6 is secured by any suitable fastening means, not shown.

A lens board 7, secured to and closing the forward end of the bellows 3, is slidably supported on the member 6, and is guided in its movements toward and away from the camera body 2 by a rod 8, rigidly secured to and projecting inwardly or rearwardly from the lens board. This rod 8 extends slidably through upright apertured guide members 9, preferably integrally formed on the support member 6.

The camera 1 is supported upon a beveled plate or disk 10, for rotary movement therewith and angular movement relative thereto, by means of a transversely disposed rod 11, the ends of which pass snugly through aligned openings 35 and 36 formed respectively in the side members 4 and 5, the opening 35 being considerably larger than opening 36, for a purpose presently understood. The plate or disk 10 seats upon and is rotatably held to a stationary base plate or disk 10' by means of an undercut or beveled ring 31. A post or arm 12, fixedly mounted upon the disk 10, is provided at its upper end with apertured ears 13 in which the intermediate portion of the rod 11 is fixedly supported. One end 14 of the rod 11 is threaded to receive a flanged threaded adjusting nut or sleeve 15 and a lock nut 16, for controlling the lateral position of the camera, and the other end 17, which extends through opening 36, is provided with graduations 18 indicating the height of the camera from the field of view, as will be more fully explained hereinafter. The inner reduced end of sleeve nut 15, seats in the enlarged opening 35 in side member 5 and is held therein by a ring nut 32. While thus fixed against lateral relative movement with respect to the side member 5, the sleeve nut 15 is free to rotate relative to the rod 11. Consequently rotary movement of the sleeve nut imparts lateral movement to the camera. A three dimensional cam 19, also more fully described later on, is removably fixed to the post 12, between the ears 13 by means of screws 33, and is constantly engaged by the follower rod or pin 8, under the influence of a compression spring 20. One end of this spring bears against one of the guide and support members 9 while its other end engages a collar 21, fixed to the rod 8. Consequently the follower rod or pin 8 is held in resilient engagement with the cam 19 at all times.

The plate or disk 10' is suitably fixed to and supported for leveling adjustment upon the fixed top 22' of a conventional tripod 22, by means of adjustable uprights 31. As this type of adjustment is standard with surveying instruments, further description is deemed unnecessary. Any suitable instruments are provided for indicating the proper positioning of the plates 10 and 10', such as spirit levels, 24' and 25', mounted thereon at substantially right angles to each other, it being understood that the connection 37 between the plates or disks 10, 10' and the top 22' permits of these plates being tilted to any desired adjusted horizontal position. For many uses the tripod 22 is positioned upon a grandstand or the like 24, at a considerable height from the ground surface, such as a sport field or race track 25, wherein the height of the camera is indicated by the dotted line 26 and the distance from the main object of interest, in the present instance an automobile 27, is shown by the dotted line 28. The angular adjustment is represented by the arrow 29.

It will be apparent that as the object moves about the field, and as the camera is tilted more or less to keep the object in view, the distance to the object will change. This requires a continual change of the focusing adjustment of the camera and particularly where lenses of large apertures and focal lengths are used. It should also be noted that in the particular application of the present invention, as depicted in Figure 1 of the drawing, the position of the camera in azimuth or horizontal angle is of no importance since the distance 28 depends only on the angle 29 and on the height 26 above the plane of action. Therefore the mechanism just described has been so designed that a change in the angle 29 automatically results in a change of focus in the camera or other device which is employed to follow upon an object or a relatively small area in the plane of interest.

After the plates 10—10' have been leveled the lateral position of the camera frame or body 2, with respect to the three dimensional cam 19, is effected by rotating the knurled sleeve nut 15, in an appropriate direction, thus causing relative movement of the rod 8 with respect to the cam 19. It will be noted that the ring 32 and flange 34, formed on the sleeve nut 15, bear against opposite sides of side member or wall 5 and move the camera body laterally with respect to the fixed rod 11 when the sleeve nut is rotated. Where the height is known and adjustment is effected to cause the correct graduation on scale 18, for such predetermined height, to become flush with the outside surface of side member 4, the lock nut 16 is screwed home against the sleeve nut 15, thus locking the camera body in its proper laterally adjusted position for desired sharp focus. If the height is not known the ground glass of the camera is used and the camera is focused upon any object on the ground, by turning the sleeve nut 15 in the manner just described, and once sharp focus is obtained sleeve nut 15 is locked by nut 16. In other words the sleeve member 15 is employed to set the camera for its correct height.

The operation just described also determines the element on the cam 19 which will thereafter determine the focusing of the camera automatically. Rod 8, the end of which is held in resilient engagement with the cam 19, will be moved along its axis if the camera is subsequently tilted to any position in following the action on the field. Axial movement of rod 8, outwardly or inwardly is automatically communicated to the lens board 7, thus constantly maintaining the latter in its correct relationship with respect to the body section 6. All the operator has to do is to keep his main point of interest, for example the automobile 27, in the center of his regular camera finder 30. Once the camera is set up in a particular location no further adjustment or focusing observations of any kind need be made during the photographing or televising process. The operator merely has to follow the action, without regard for the focusing mechanism, which is completely automatic.

While it is believed that the coaction between the cam 19 and follower pin 8 will be obvious from the foregoing it may not be amis to point out that when the pin 8 bears against the circular portion, which represents infinity, no change in focus will take place due to change in the angularity of the camera. If lateral adjustment is now made for camera height of 100 feet the relative position of the follower pin with respect to the cam will be changed from A to B. If lateral adjustments are thereafter necessary to compensate for changes in camera height from 100 feet to 50 feet and 20 feet, in the order named, the follower pin will move relatively to the cam, first from B to C and then from C to D position. As is well known the lense moves forward as the camera gets closer to the object.

Figure 2:
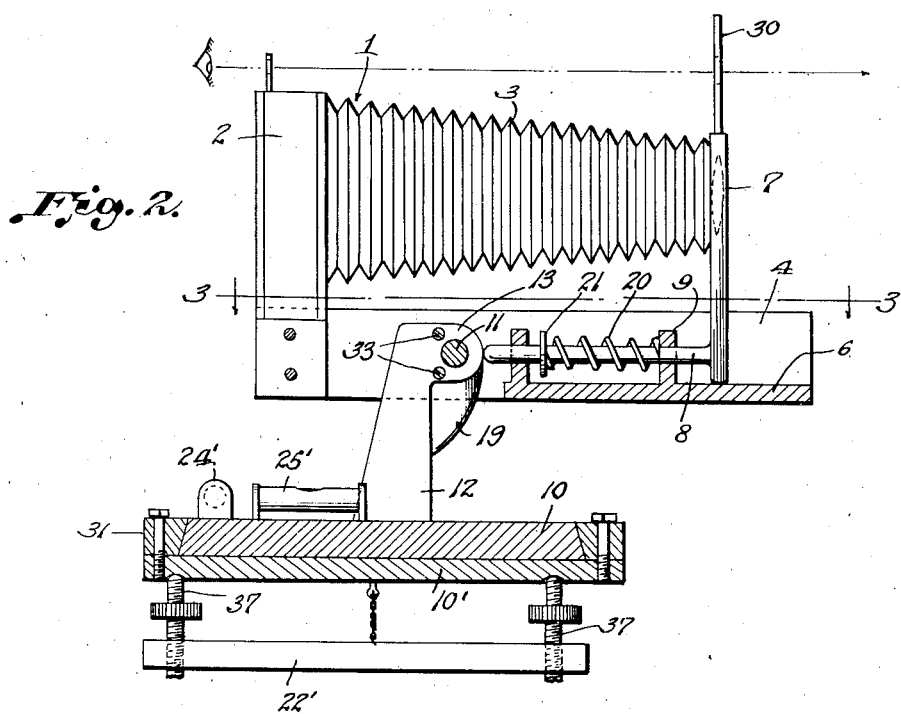
Figure 2 is a side elevation of the invention partly in section.

While in the use of the invention illustrated in Figures 2 and 3 of the drawing the angular position of the camera with respect to a horizontal plane is the basis employed in determining the proper focus, it should be understood that this angular position may be in respect to a plane in a vertical or any other position, or to any curved surface for which a similar mechanism has been devised. For instance, if action has to be followed along a curved surface, such as a ski jump, it will be necessary to substitute a special cam, not shown, for the cam 19, so prepared that as the camera is tilted to follow the jumper he will at all times remain in focus. In Figure 11 of the drawing I have shown a modified form of my invention especially adapted for following a curved surface. In this form the cam 19', instead of being rigidly attached to the post or support 12, can be rigidly attached by means of a separate part or support 40 to the stationary base plate 10'. This support can pass thru a suitable opening 41 in the rotating plate 10. A post 12', similar to the post 12, but provided with a bent end portion 40' through which the rod 11 extends, is provided and follower rod or pin 8' is also bent for an obvious purpose. Thus, as the camera is rotated in a horizontal plane the relative positions of rod 8' and cam 19' would be changed. The action caused by rotation in a vertical plane remains unchanged. Of course in this case special cams 19' will be required for each special position and the base plate 10' will have to be oriented in a special direction. The cam 19' is so mounted on the post 40 that it can readily be removed and replaced with another of proper size or contour adapted for different surfaces of action and to different lenses.

By the use of interchangeable cams all of the above mechanisms can be adapted for different surfaces of action and to different lenses in the same camera, within the scope of my invention. Naturally a change in lens would necessitate a change of cams. It is obvious to anyone well versed in the art that the lens and its proper cam can be built together as a unit so that in an interchangeable lens camera both can be changed simultaneously. This would eliminate the possibility of error arising from using the wrong cam lens combination and save a great deal of time.

While the mechanism shown illustrates a camera laterally movable with respect to a fixed cam, it is obvious that the camera may be laterally fixed with respect to its mounting and that the cam may be made movable with respect to the camera for initial adjustment of the focusing mechanism. While simple three dimensional cams are shown it is understood that an infinite number of linkages may be employed to accomplish the same end.

Obviously the mechanism disclosed may be initially installed at the factory in a conventional camera or the cam and follower pin may take the form of an attachment.

Having thus described my invention, what I claim is:

1. A camera adapted to remain automatically focussed on an object plane substantially removed from a fixed position of said camera, comprising: supporting means for said camera, first pivot means on said supporting means constructed and arranged to permit rotation of said camera about an axis perpendicular to the object plane; a support for a sensitive image receiving surface in said camera and a lens board movable to and from said sensitive surface to focus the camera; second pivot means between said supporting means and said camera constructed and arranged to permit rotation of said camera about an axis parallel to the said object plane and perpendicular to the lens axis; motion-controlling means operably connected between said supporting means and said lens board to move said lens board relative to said sensitive surface; means for initially adjusting said motion controlling means to adjust the camera focus for the distance between the camera and the said object plane; said motion controlling means being arranged and proportioned to maintain the camera focussed on said object plane as said camera is rotated on said second pivot means.

2. The invention of claim 1 wherein the motion controlling means comprises cam and follower means.

3. The invention of claim 1 for use with a horizontal object plane, and means for adjusting the said first pivot means so that the axis of rotation of same is substantially vertical.

4. A camera adapted to remain automatically focussed on objects which are on an object plane substantially removed from a fixed position of said camera, comprising: supporting means for said camera, first pivot means on said supporting means constructed and arranged to permit rotation of said camera about an axis perpendicular to the said object plane; a support for a sensitive image-receiving surface in said camera and a lens board movable to and from said support to focus the camera; cam follower means operationally connected to said lens board for moving same; a three dimensional cam for controlling the position of said cam follower, said cam supported by said first pivot means and rotatable thereon with the camera; manual adjusting means for laterally moving the said cam follower relative to the surface of said cam to initially focus the said camera on a point on said object plane; second pivot means on said supporting means constructed and arranged to permit rotation of the said camera and said cam follower about an axis parallel to the said object plane and perpendicular to the axis of the lens to further control the position of said cam follower, said three dimensional cam so proportioned that the manual lateral motion of the cam follower relative to the said cam adjusts the camera focus for the distance between the camera and the said object plane, and so proportioned also that as the camera is rotated about said second pivot means the motion of the cam follower relative to the cam maintains the camera focussed on the object plane.

JACOB RABINOW.

REFERENCES CITED

The following references are of record in the file of this patent:

UNITED STATES PATENTS

| Number | Name | Date |
| --- | --- | --- |
| 1,136,761 | Becker | Apr. 20, 1915 |
| 1,258,459 | Read | Mar. 5, 1918 |
| 1,856,432 | Rudolph et al. | May 3, 1932 |
| 1,982,322 | Ries et al. | Nov. 27, 1934 |
| 2,111,854 | Gasso et al. | Mar. 22, 1938 |

FOREIGN PATENTS

| Number | Country | Date |
| --- | --- | --- |
| 321,288 | Great Britain | Nov. 7, 1929 |